United States Patent [19]

Gregg

[11] 3,918,617
[45] Nov. 11, 1975

[54] GATE FOR FLUENT MATERIAL

[76] Inventor: F. Browne Gregg, P.O. Box 1046, Leesburg, Fla. 32748

[22] Filed: Oct. 17, 1974

[21] Appl. No.: 515,724

[52] U.S. Cl. .............................. 222/536; 222/538
[51] Int. Cl.² .......................................... B67D 3/00
[58] Field of Search .......... 222/531, 532, 533, 536, 222/537, 538, 529, 530

[56] References Cited
UNITED STATES PATENTS

| | | | |
|---|---|---|---|
| 1,286,496 | 12/1918 | Barbieri | 222/536 X |
| 2,260,433 | 10/1941 | Cadwell | 222/536 X |
| 2,603,342 | 7/1952 | Martinson | 222/536 X |
| 3,052,384 | 9/1962 | Clark | 222/536 X |
| 3,788,791 | 1/1974 | Munz | 222/536 X |

*Primary Examiner*—Allen N. Knowles
*Assistant Examiner*—Hadd Lane
*Attorney, Agent, or Firm*—A. Yates Dowell, Jr.

[57] ABSTRACT

Apparatus for dispensing fluent material and for interrupting the flow thereof. The apparatus includes a selectively operated gate which is adjustable to control the flow of material while an associated chute mechanism remains in operative position and such gate automatically moves the chute mechanism to an inoperative position when the gate is substantially closed.

8 Claims, 4 Drawing Figures

3,918,617

GATE FOR FLUENT MATERIAL

BACKGROUND OF THE INVENTION

1. Field of the Invention

This invention relates generally to the dispensing of fluent materials and relates particularly to gate mechanisms for controlling the flow of fluent material.

2. Description of the Prior Art

Heretofore the dispensing of fluent material from a hopper or other source of supply has been controlled both manually and automatically by gates of various kinds, screw conveyors, and the like. When the material is dispensed from the bottom of the source of supply, swinging gates which control the volume of flow normally are employed so that the material can flow by gravity thereby reducing the power demands on the system. In many cases the material flows past the gate and is discharged into a container such as a bucket, a skip or skep, truck or the like, or such material can be directed onto a moving conveyor for transporting the material to a remote location. Conveyor belts normally are used when two or more materials are to be combined. Some examples of the prior art are the patents to Dull 1,843,124; Cadwell 2,260,433; Martinson 2,603,342; Heltzel 2,663,466; Bell 2,679,335; Coucher 3,612,364; German Pat. No. 520,598; and Swedish Pat. No. 166,660.

SUMMARY OF THE INVENTION

The present invention is embodied in a combined swinging gate and chute mechanism associated with a material guide tube. The gate is selectively operable to control the flow of fluent material through the guide tube at a desired rate and such material passes through the chute associated with the guide tube onto a conveyor or receptacle where the material is carried to a remote location. The chute remains in operative position until the gate has substantially interrupted the flow of material through the guide tube after which the gate automatically raises the chute to an inoperative position where it is latched so that the system cannot open in the event of a power failure or leakage in a fluid line.

It is an object of the invention to provide a selectively operated gate and chute mechanism associated with a gravity flow material guide tube and arranged in such a manner that the gate controls the volume of flow through the guide tube into the chute and automatically raises the chute to an inoperative position when the flow of material through the guide tube is interrupted.

DESCRIPTION OF THE PREFERRED EMBODIMENT

Figure 1:
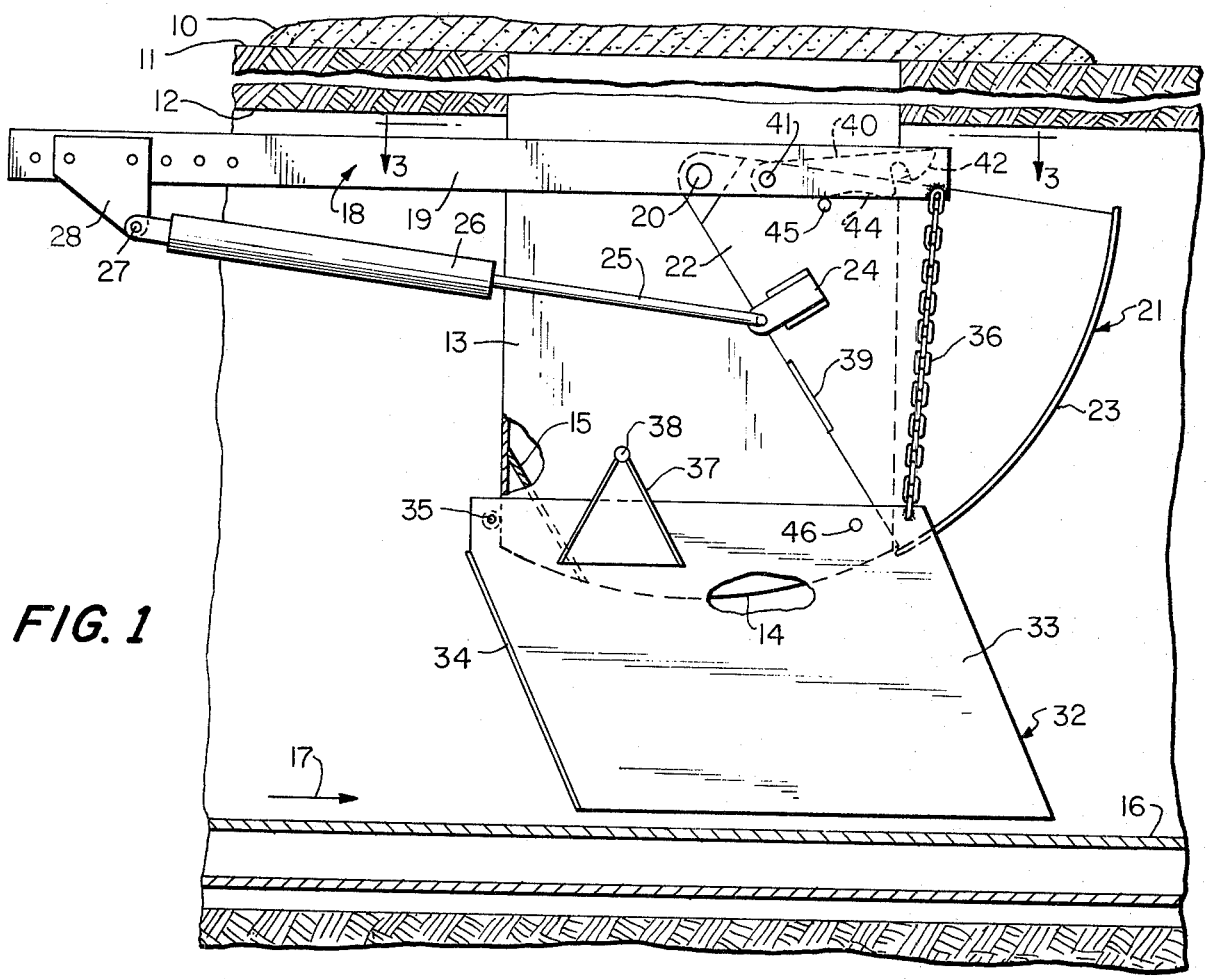
FIG. 1 is a side elevation illustrating one application of the invention in fully open position.

With continued reference to the drawings, a relatively large supply of fluent material 10, such as sand, aggregate, gravel, coal or the like, is positioned for transfer and such fluent material may have a relatively high liquid content or may be substantially dry. In the illustrated embodiment, the supply of fluent material is piled on a supporting surface 11 and communicates with a lower area such as a tunnel 12 by means of one or more material guide tubes 13 each of which has an inlet opening at the upper end and a discharge opening 14 with a generally arcuate configuration at the lower end. A baffle 15 is disposed across the lower end of each guide tube 13 to restrict the size of the discharge opening. An endless conveyor 16 is located below the guide tubes 13 and the upper run of such conveyor normally is driven in the direction of the arrow 17 by a conventional power plant (not shown). It is noted that the source of supply of the material could be contained within a conventional hopper or other receptacle from which the material is discharged either by gravity or by power operated equipment.

Adjacent to the lower end of the guide tubes 13, a mounting frame 18 is provided which includes a pair of elongated generally parallel beams 19 disposed on opposite sides of each of the guide tubes 13 and which may be supported in any desired manner, as by downwardly extending legs or by brackets from an overhead structure. Each of the beams 19 has an inwardly extending pivot 20 located along the plane of the vertical axis of each of the guide tubes and such pivots swingably support a gate 21 having a pair of spaced generally parallel triangular shaped side walls 22 connected by an imperforate arcuate wall 23. The arc of the wall 23 and the arc of the discharge end 14 of the guide tubes are complementary to each other so that the wall 23 is in close proximity to the discharge opening of the guide tube when the gate is in closed position.

In order to selectively operate the gate 21, at least one of the side walls 22 is provided with a mounting lug 24 which is swingably connected to the piston rod 25 of a fluid cylinder 26. The opposite end of the cylinder is connected by a pivot 27 to a lug 28 carried by the beam 19. The operation of the fluid cylinder 26 moves the gate 21 to any selected position between the fully open position illustrated in FIG. 1 and the fully closed position illustrated in FIG. 2.

A generally U-shaped horizontally disposed chute 32 is provided having generally parallel side walls 33 connected by a rear wall 34. The upper rear portion of each of the side walls 33 is provided with an inwardly extending pivot or shaft 35 which is swingably mounted adjacent to the lower end of the guide tube 13 so that the lower portion of the chute is spaced above the conveyor 16. The forward end of each of the side walls 33 is supported from the beam 19 in any desired manner, as by a flexible support member or connector 36 such as a chain, cable or the like, which has opposite ends welded or otherwise attached to the beams 19 and the side walls 33 of the chute. Preferably the side walls 33 of the chute are spaced apart a distance greater than the spacing of the side walls 22 of the gate so that the gate 21 moves between the chute walls.

Each of the side walls 33 of the chute is provided with an upstanding bracket 37 which may be an integral part of the side wall or may be a separate member which is welded or otherwise attached thereto. Each of the brackets 37 has a pin or projection 38 extending inwardly toward the guide tube 13. In order to raise the chute 32 to an inoperative position when the gate 21 is closed, the rearmost edge of each of the side walls 22 of the gate is provided with an elongated outwardly extending contact plate or abutment member 39 which is adapted to engage the inwardly extending projection 38 of the chute when the gate is moved toward closed position. Since the projection 38 is located at a higher elevation than the pivots 35, a rearward force applied thereto by the abutment members 39 causes the chute to swing upwardly about the pivots 35 and relieve the strain on the flexible connector 36. It is noted that the abutment members 39 engage the projections 38 on opposite sides of the chute 32 at approximately the time that the imperforate wall 23 of the gate passes the lower end of the baffle 15 and interrupts the flow of material through the guide tube 13 so that the chute 32 remains in operative position as long as material is flowing through the tube 13.

Normally the weight of the chute 32 tends to swing the chute downwardly by gravity so that the projections 38 cam the gate 21 toward at least partially open position, particularly if the pressure within the cylinder 26 is relieved. In order to prevent this and to support the chute 32 in the retracted inoperative position, a latch 40 is swingably mounted at one end by a pivot 41 to one of the beams 19 in such a manner that the free end of the latch tends to hang downwardly by gravity. The unsupported or free end of the latch 40 has an upwardly curved cam surface 42 which terminates in a recessed mouth 43 extending inwardly from one side of the latch.

Figure 2:
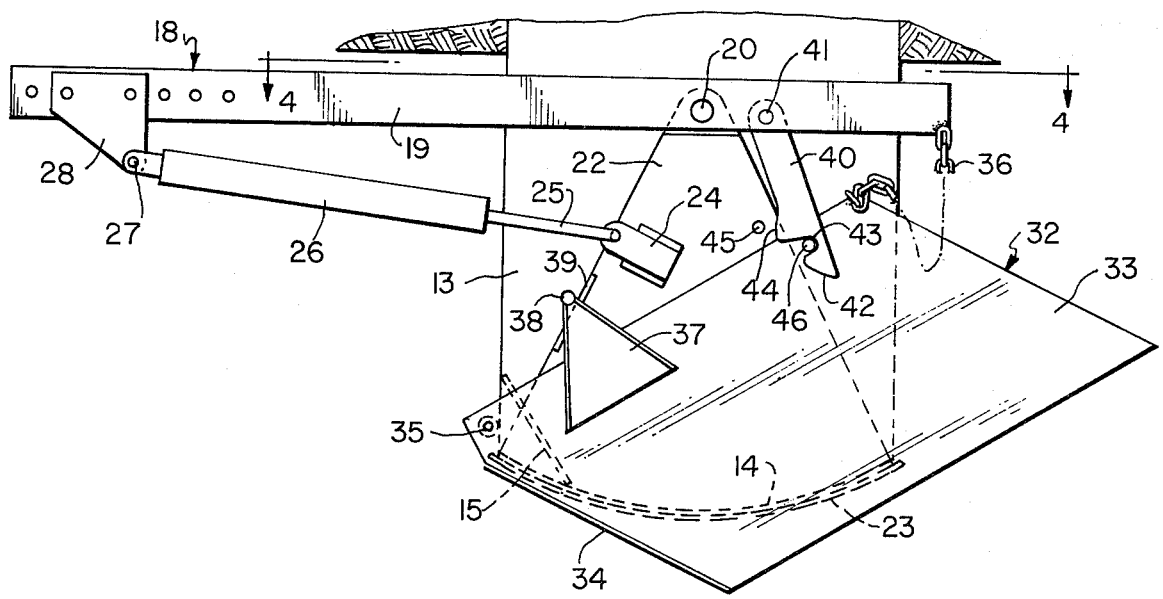
FIG. 2 is a side elevation illustrating the apparatus in closed position.
Figures 3, 4:
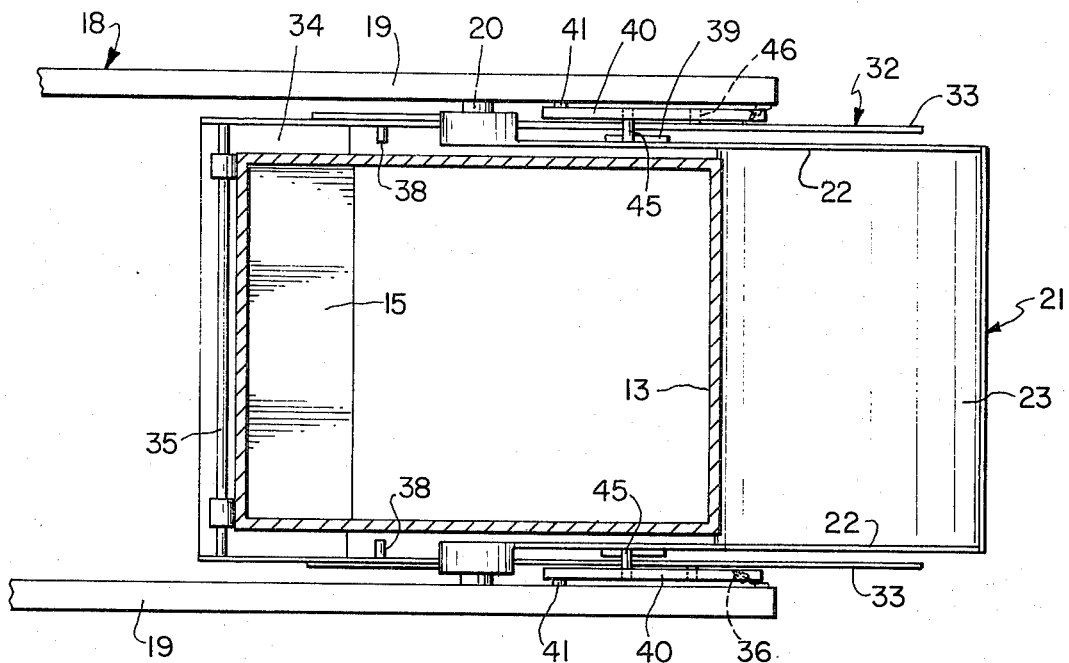
FIG. 3 is a section on the line 3—3 of FIG. 1.
FIG. 4 is a section on the line 4—4 of FIG. 2.

An outwardly extending tang or enlargement 44 is provided on the latch 40 immediately above the mouth 43 and such tang is located in a position to be engaged by an actuating pin 45 mounted on and extending outwardly from the side 22 of the gate. A support pin 46 is mounted on the side wall 33 of the chute and extends inwardly therefrom in a position to engage the cam surface 42 when the chute 32 is raised and cause the latch to swing upwardly until the pin 46 is received within the mouth 43, as illustrated in FIG 2. In this position, pressure within the fluid cylinder 26 may be relieved whereupon the latch 40 supports the weight of the chute 32.

In the operation of the device, when the structure is in the position illustrated in FIG. 1, the gate 21 is in the fully open position and fluent material 10 flows by gravity from the source of supply through the guide tube 13 and the chute 32 onto the conveyor 16. When it is desired to interrupt the flow of material, fluid under pressure is introduced into the outer end of the fluid cylinder 26 to retract the piston rod 25 and swing the gate 21 about the pivots 20 so that the imperforate arcuate wall 23 of the gate closes the bottom discharge opening of the guide tube 13. During most of the time that the gate is closing, the chute 32 remains in its operative position.

As the edge of the arcuate wall 23 approaches the lower end of the baffle 15 to interrupt the flow of material through the guide tube, the abutment members 39 engage the projections 38 of the chute and continued closing movement of the gate causes the chute to swing upwardly about the pivots 35. The closing movement of the gate 21 moves the actuating pin 45 downwardly so that the free end of the latch 40 swings downwardly by gravity. While the latch 40 rests on the actuating pin 45 during the downward movement of the gate, the upward movement of the chute 32 causes the support pin 46 to intercept the cam surface 42 of the latch and swing the latch upwardly away from the actuating pin 45 until the support pin is received within the mouth 43. In this position, the gate 21 is fully closed and substantially prevents the flow of material through the guide tube. Also the chute 32 is in a raised inoperative position where it is supported by the latch 40.

When it is desired to open the guide tube to permit material to flow therethrough, fluid under pressure is introduced into the inner end of the cylinder 26 to extend the piston rod 25. The outward movement of the piston rod swings the gate 21 upwardly which causes the actuating pin 45 to engage the tang 44 of the latch and swing the latch upwardly to release the support pin 46 of the chute. When the support pin is released, the chute 32 begins to swing downwardly by gravity; however, the projections 38 of the chute immediately engage the contact plates or abutment members 39 of the gate so that the chute is lowered gradually as the gate is moved toward open position until all of the slack is taken out of the flexible support or connector 36 after which the connector supports the chute 32 in operative position. Outward movement of the piston rod 25 continues until a desired rate of flow is accommodated between the baffle 15 and the arcuate wall 23 of the gate. Fluent material which passes through the guide tube is confined by the chute 32 and discharged onto the conveyor 16 where it is moved to a remote discharge station.

I claim:

1. Apparatus for selectively dispensing fluent material from a source of supply comprising tube means communicating with the source of supply and having a discharge opening, gate means associated with said tube means, said gate means having an imperforate wall located adjacent to said discharge opening, means for selectively operating said gate means for interrupting the flow of material and for controlling the flow of material through said discharge opening, chute means for directing the material passing through said discharge opening to a receiver, said chute means being swingably mounted adjacent to one side of the discharge opening of said tube means, first interengageable means carried by said gate means, second interengageable means carried by said chute means, and said first and second interengageable means being positioned so that said first interengageable means freely abuts said second interengageable means only when said gate means has moved to a substantially closed position in which said imperforate wall has substantially interrupted the flow of material through said discharge opening and thereafter moves said chute means to an inoperative position.

2. The structure of claim 1 in which said chute means is swingably supported on said tube means, and said interengageable means includes a projection carried by said chute means and an abutment member carried by said gate means.

3. The structure of claim 2 in which said projection is mounted on a bracket and located at a higher elevation than said swingable support.

4. The structure of claim 1 including a support member for supporting said chute means while material is being dispensed through said discharge opening.

5. The structure of claim 1 including latch means for supporting said chute means in inoperative position.

6. Apparatus for selectively controlling the dispensing of fluent material from a source of supply comprising guide tube means communicating with the source of supply and having a discharge opening, a gate swingably mounted along the vertical axis of said guide tube means, said gate including an arcuate imperforate wall located adjacent to said discharge opening, fluid cylinder means for selectively operating said gate to interrupt the flow of material or to control the flow of material through said discharge opening, a chute swingably mounted on said guide tube means adjacent to said discharge opening, a projection carried by said chute in spaced relationship to said swingable connection, an abutment member carried by said gate and located in a position to freely abut the projection of said chute only when the imperforate wall of said gate has substantially interrupted the flow of material through said discharge opening and thereafter causes said chute to be swung to an inoperative position by said abutment member, and means for supporting said chute in the inoperative position.

7. The structure of claim 6 in which said means for supporting said chute in inoperative position includes pin means carried by said chute, a latch swingably supported by a fixed structure, said latch having a cam located adjacent to a mouth, whereby when said chute is moved to an inoperative position, said pin means engages said cam and moves said latch so that said pin means is received within the latch mouth.

8. The structure of claim 7 in which said gate includes an actuating pin for engaging said latch to release said pin means from the latch mouth when said gate is opened.

* * * * *